March 15, 1949.   R. PROSKAUER   2,464,259
PULSE CIRCUITS
Filed May 11, 1944

INVENTOR
RICHARD PROSKAUER
BY
Paul B. Hunter
ATTORNEY

Patented Mar. 15, 1949

2,464,259

UNITED STATES PATENT OFFICE 2,464,259

PULSE CIRCUITS

Richard Proskauer, Westbury, N. Y., assignor to The Sperry Corporation, a corporation of Delaware Application May 11, 1944, Serial No. 535,069

2 Claims. (Cl. 250—36)

My invention relates to circuits for electric discharge devices and concerns, particularly, pulse generating circuits.

An object of the invention is to provide a source of electrical impulses in which pulses may be obtained in periodically recurrent groups of two or more pulses.

A further object of the invention is to provide a multiple-pulse blocking oscillator.

Other and further objects, features and advantages of the invention will become apparent as the description proceeds.

In one embodiment of the invention, a blocking oscillator circuit is employed in which a parallel tuned circuit is connected in the cathode lead instead of connecting the cathode directly to the negative terminal of the power supply.

A better understanding of my invention will be afforded by the following detailed description considered in conjunction with the accompanying drawing, and those features of the invention which are believed to be novel and patentable will be pointed out in the claims appended thereto.

Figure 1:
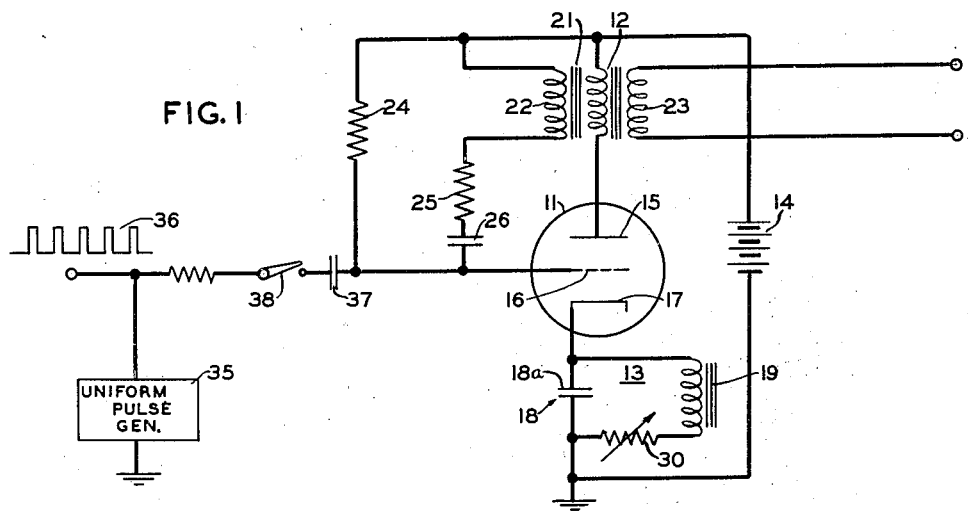
Fig. 1 is a circuit diagram of one embodiment of my invention.

The apparatus illustrated comprises an electric discharge device such as a vacuum tube 11, a pulse transformer 21, a tuned circuit or tank circuit 13 and a power supply 14, represented for convenience as a battery of cells. The tube 11 includes conventional electrodes, namely, an anode 15, a control electrode or grid 16 and a cathode 17. The tank circuit 13 includes a condenser 18 and an inductance 19. The pulse transformer 21 includes a winding 12 connected in series with the tube 11 between the positive terminal of the power supply 14 and the anode 15, a second winding 22 connected to the grid circuit of the tube 11, and if desired also a third winding 23 serving as an output winding.

For providing a return to a voltage above cut-off, a grid leak resistor 24 is connected between the positive terminal of the power supply 14 and the grid 16. For coupling the grid to the grid winding 22 of the pulse transformer 21, the winding 22 is connected at one end to the positive terminal of the power supply 14 and is coupled at the other end through a coupling condenser 26 to the grid 16. If desired a throttling resistor 25 may be provided. In the arrangement illustrated it is connected in series with the coupling condenser 26.

The period of the tank circuit 13 is made considerably shorter than the period of the blocking oscillator with this tank circuit short circuited, in order that oscillations may be produced having a higher frequency than the blocking oscillator pulses which would normally be produced by the blocking oscillator without the tank circuit 13.

Figure 2:
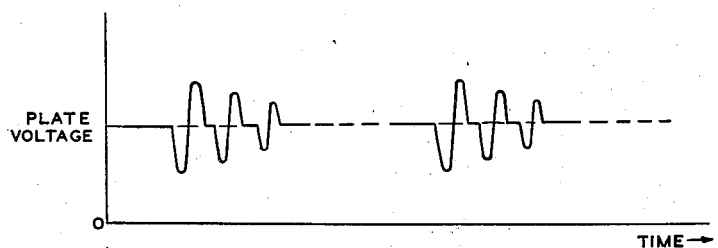
Figs. 2, 3 and 4 are graphs illustrating the principle of operation of the apparatus of Fig. 1.
Figure 3:
Figure 4:
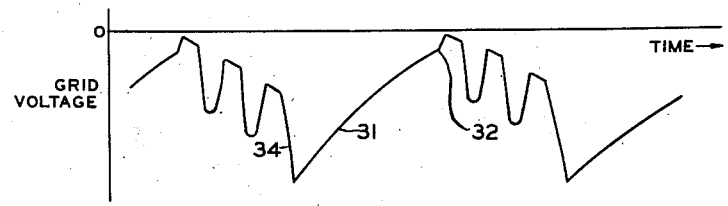

The wave forms of the voltages appearing at the plate, the cathode and the grid of the tube 11 are illustrated in Figs. 2, 3 and 4, respectively.

It will be understood that in a normally operating blocking oscillator circuit, the grid 16 is alternately driven positive to render the tube 11 conductive and driven strongly negative beyond cut-off to render the tube non-conductive. Since the grid 16 is returned to a voltage above cut-off by the grid leak 24 the grid 16 always tends to drift in the positive direction, but as soon as the potential difference between the grid and the cathode becomes less than the cut-off voltage, the tube 11 becomes conducting, a pulse of current flows through the winding 12 and abruptly induces a voltage in the winding 22. The polarity of the induced voltage is such as to drive the grid 16 more strongly positive, attracting electrons from the cathode to the grid, whereby a strong charge is built up upon the condenser 26 which eventually biases the grid 16 negative and holds the tube 11 in a cut-off condition during the period between current pulses. The presence of the tuned circuit 13, however, results in higher frequency oscillations taking place whenever the tube 11 has been rendered non-conducting by the negative charge on condenser 26.

The behavior of the circuit appears to be as follows: During the relatively long cut-off time between groups of higher frequency oscillations or pulses, the blocking oscillator tube 11 is in non-conducting condition. During this time the grid is held at a voltage below cut-off by a charge built up on the grid condenser 26. The tube begins to conduct when the voltage on the grid condenser has been reduced by leakage of its charge through the grid leak 24 to such a point that the potential difference between the cathode and the grid is equal to the cut-off voltage of the tube, as illustrated in Fig. 4. The grid voltage gradually rises along the line 31 until it reaches cut-off at the point 32.

When plate current conduction begins, as in the normal blocking oscillator circuit, a voltage is induced in the grid winding 22 of the blocking oscillator transformer by the rate of change of plate current. This change is of such polarity that the grid is driven further positive and a current rapidly builds up to a saturation value as in other blocking oscillators. Just as in other blocking oscillators, when the plate voltage has fallen to substantially that of the cathode and there is no further rate of increase in current, the induced voltage in the winding 22 falls to zero. The pulse is cut off since the grid current flow during the conducting period has charged the grid condenser 26 to a voltage considerably in excess of the cut-off voltage.

The role of the tank circuit 13 appears to be as follows: Owing to the high inductance of the choke coil 19, no appreciable current is built up through it during the brief conduction period. The charge moved during the pulse, therefore, comes from the condenser 18 causing its ungrounded plate 18a to become positive. At the conclusion of the initial pulse, the condenser 18 is left with the positive charge and the tank circuit 13 then oscillates at its free natural frequency. Owing to the fact that the tube 11 has been cut off, it does not tend to damp out this oscillation.

The free oscillation of the tank circuit upon cut-off of the tube causes the voltage of the cathode with respect to ground to undergo sinusoidal excursions as illustrated in Fig. 3. At successive times when the cathode is falling in potential, the tube conducts again owing to the fact that the decreasing cathode potential results in the grid becoming less negative with respect to the cathode. The cut-off condition depends upon the potential difference between the grid 16 and the cathode 17, rather than upon the actual voltage of the grid 16 with respect to ground. The number of successive pulses which take place is limited by the voltage across the grid condenser 26, which builds up with each pulse until the negative voltage on the grid exceeds the negative voltage which can be reached by the cathode by an amount larger than the cut-off bias of the tube 11.

Whenever the cathode voltage reaches the lower limit value and permits current to flow through the tube 11, an additional voltage pulse is induced in the grid winding 22, so that the grid voltage also fluctuates at the frequency of the cathode voltage. However, after a sufficient cumulative grid current has flowed to charge the grid condenser 26, the grid voltage falls sharply along the line 34 (Fig. 4), driving the tube to cut-off and no further conduction takes place until the grid voltage has risen along the portion 31 of the grid voltage curve to the grid voltage 32.

By adjusting the rheostat 30, the number of oscillations produced in each group may be adjusted so that the circuit may be employed for producing a series of pulses at a frequency considerably higher than the frequency of oscillation which would be produced by the time constant of the grid circuit and an effect may be produced corresponding to high frequency pulses with blanks of adjustable length between groups of pulses.

On the other hand, if the trigger pulse generator 35 has a frequency equalling the desired repetition rate for groups of pulses, the accuracy of repetition rate is determined thereby and the frequency of the induced oscillations is determined by the resonant frequency of the tuned circuit 13. In this case the grid 16 may be biased to substantially cathode voltage without risking frequency drift.

Figure 5:
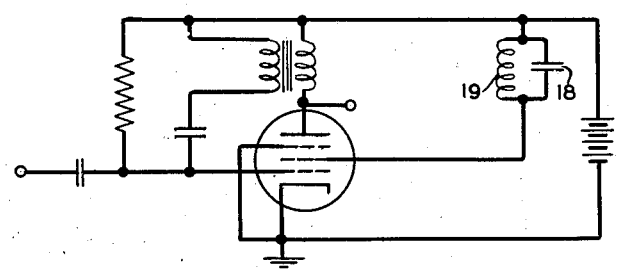
Fig. 5 is a circuit diagram of a modified embodiment.

Although the tuned circuit 13 has been shown connected in the anode-cathode circuit of the tube 11, it will be understood that my invention is not limited to the specific arrangement shown. In the case of a multi-electrode tube the tuned circuit may be connected in the circuit of another suitable electrode. For example, in the case of a pentode as illustrated in Fig. 5, the tuned circuit may be connected in the screen grid circuit.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. In combination, an electric discharge device having an anode, a cathode and a control electrode, a pulse transformer with a first winding connected in series with the anode and a grid winding connected at one end to the first winding, a grid leak resistor connected to said control electrode, a coupling condenser and a damping resistor connected in series with the remaining end of the grid winding and the control electrode, a resonant tank circuit connected in series with the cathode of the electric discharge device, and means connected to said first winding for applying to said anode and said control electrode a positive potential with respect to said cathode.

2. An electric wave source comprising: a high-vacuum electron discharge device having a cathode, an anode and a control electrode; a resonant circuit having a first terminal connected to said cathode and having a second terminal; a transformer having a plurality of windings; an electric energy source connected in series with one winding of said transformer between said second terminal of said resonant circuit and said anode for producing electronic current through said device; and series-connected means including a resistance-capacitance circuit and a winding of said transformer coupling said control electrode to said second terminal of said resonant circuit, said control electrode being coupled to said electric energy source and biased thereby with respect to said cathode; whereby variations in the electronic current through said cathode and said anode induce voltage changes between said cathode and said control electrode to produce oscillations for exciting said resonant circuit.

RICHARD PROSKAUER.

REFERENCES CITED

The following references are of record in the file of this patent:

UNITED STATES PATENTS

| Number | Name | Date |
| --- | --- | --- |
| 1,919,985 | Patterson | July 25, 1933 |
| 1,923,252 | Brolly | Aug. 22, 1933 |
| 2,135,740 | Urtel | Nov. 8, 1938 |
| 2,179,607 | Bedford | Nov. 14, 1939 |
| 2,212,202 | Faudell | Aug. 20, 1940 |
| 2,277,000 | Bingley | Mar. 17, 1942 |
| 2,288,554 | Smith | June 30, 1942 |
| 2,292,835 | Hepp | Aug. 11, 1942 |
| 2,297,742 | Campbell | Oct. 6, 1942 |
| 2,364,756 | Roberts | Dec. 12, 1944 |